United States Patent [19]
Danstrom

[11] Patent Number: 5,987,615
[45] Date of Patent: Nov. 16, 1999

[54] PROGRAMMABLE LOAD TRANSIENT COMPENSATOR FOR REDUCING THE TRANSIENT RESPONSE TIME TO A LOAD CAPABLE OF OPERATING AT MULTIPLE POWER CONSUMPTION LEVELS

[75] Inventor: Eric J. Danstrom, Palatine, Ill.

[73] Assignee: STMicroelectronics, Inc., Carrollton, Tex.

[21] Appl. No.: 08/995,503

[22] Filed: Dec. 22, 1997

[51] Int. Cl.$^6$ ............... G05F 1/10; G05F 1/44; G06F 1/26

[52] U.S. Cl. ............ 713/300; 713/323; 323/283; 323/351

[58] Field of Search ................ 713/300, 320, 713/323, 321; 323/274, 281, 312, 283, 284, 351; 324/433; 330/282

[56] References Cited

U.S. PATENT DOCUMENTS

| | | | |
|---|---|---|---|
| 4,318,039 | 3/1982 | Abbott | 323/273 |
| 4,366,433 | 12/1982 | Imazeki et al. | 323/281 |
| 4,376,265 | 3/1983 | Kiuchi et al. | 324/426 |
| 4,400,660 | 8/1983 | Schaefer | 323/270 |
| 4,540,952 | 9/1985 | Williams | 330/282 X |
| 4,603,288 | 7/1986 | Rogers | 323/234 |
| 4,628,247 | 12/1986 | Rossetti | 323/314 |
| 4,633,162 | 12/1986 | Melbert | 323/275 |
| 4,833,725 | 5/1989 | Teetor | 455/67.3 |
| 4,980,836 | 12/1990 | Carter et al. | 364/483 |
| 5,191,278 | 3/1993 | Carpenter | 323/275 |
| 5,412,346 | 5/1995 | Burger, Jr. et al. | 330/282 |
| 5,448,156 | 9/1995 | Tsay | 323/312 |
| 5,453,678 | 9/1995 | Bertolini et al. | 323/282 |
| 5,486,791 | 1/1996 | Spitalny et al. | 330/282 |
| 5,548,506 | 8/1996 | Soo | 323/284 |
| 5,648,718 | 7/1997 | Edwards | 323/274 |
| 5,805,923 | 9/1998 | Shay | 710/8 |
| 5,848,282 | 12/1998 | Kang | 361/695 |

OTHER PUBLICATIONS

Grebene, Alan. *Bipolar and MOS Analog Integrated Circuit Design.* John Wiley & Sons Publishers. 1984. pp. 706–712.

*Primary Examiner*—Gopal C. Ray
*Attorney, Agent, or Firm*—Theodore E. Galanthay; Lisa K. Jorgenson; Renee M. Larson

[57] ABSTRACT

A load transient compensator and method of operating the load transient compensator for reducing the transient response time to a load capable of operating at either of several consumption levels when the load changes its power consumption level. The load transient compensator has a comparator having an output connected to an input of an upper driver and of a lower driver with the output of each of the driver being connected to a gate of a power transistor. When the load is in sleep mode and is about to start being accessed, the upper driver is turned on to turn on its associated transistor to supply additional current to the load, regulated by the comparison circuit. When the load is in the power up mode and it is about to stop being accessed, the lower driver is turned on to turn on its associated transistor to drain current supplied to the load by a supply, regulated by the comparison circuit. This allows a quicker response to the large changes in current required by the load when the load is changing its level of power consumption without greatly increasing the cost of the system containing the load and without compromising the stability of the system.

29 Claims, 2 Drawing Sheets

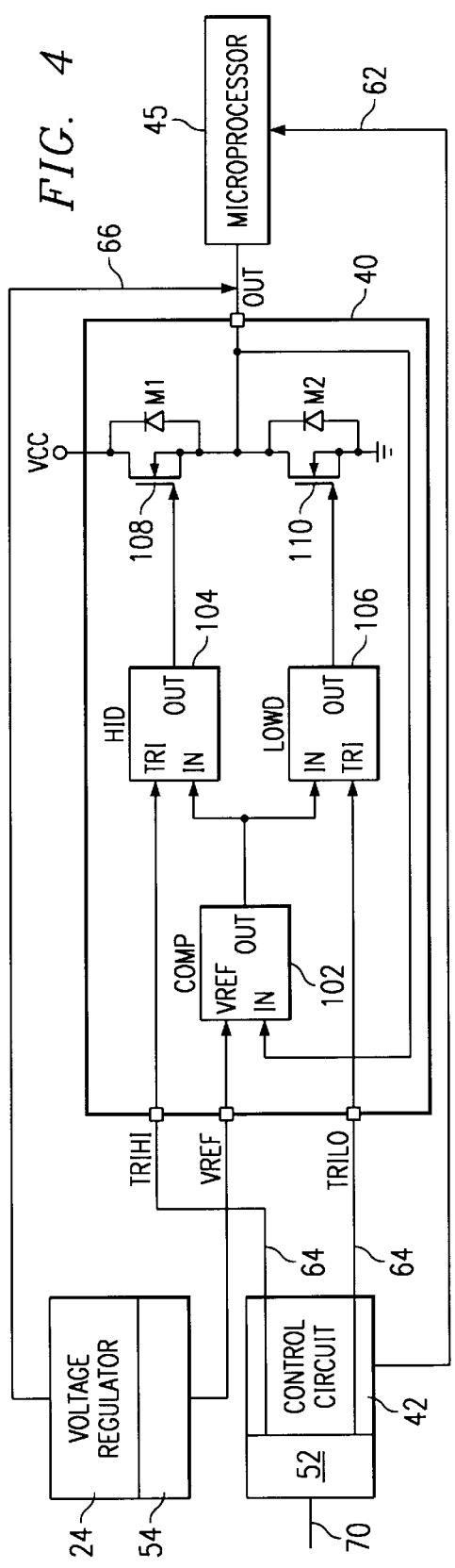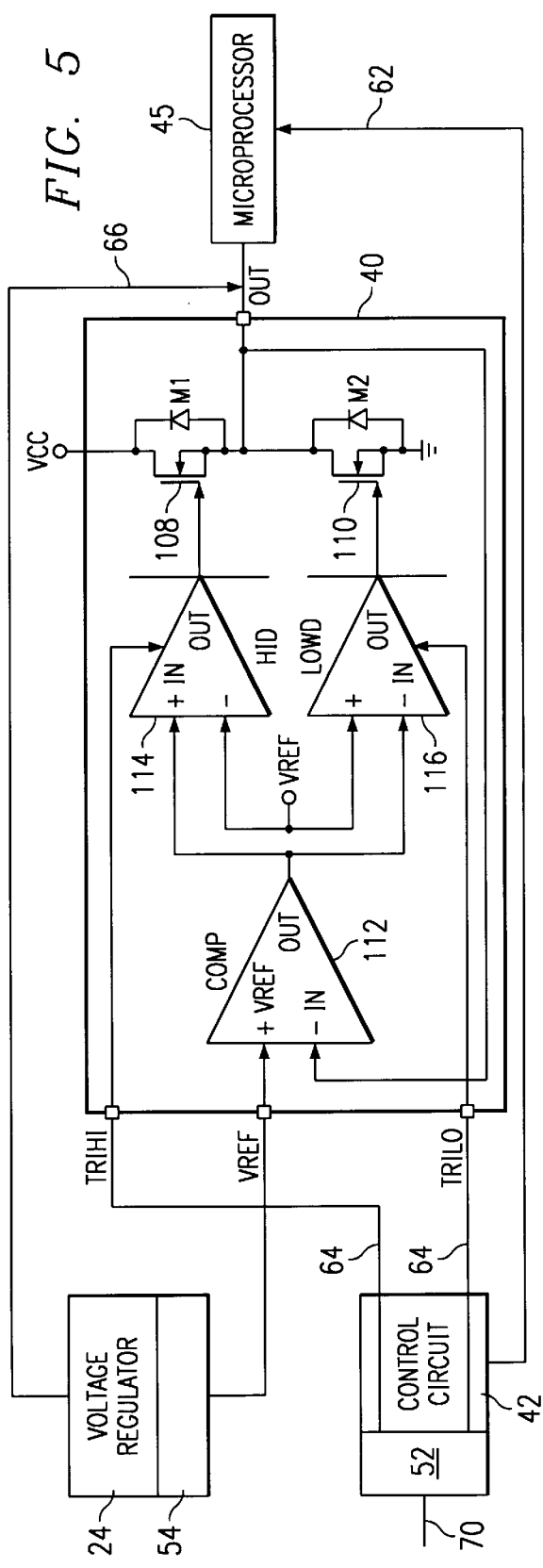

PROGRAMMABLE LOAD TRANSIENT COMPENSATOR FOR REDUCING THE TRANSIENT RESPONSE TIME TO A LOAD CAPABLE OF OPERATING AT MULTIPLE POWER CONSUMPTION LEVELS

TECHNICAL FIELD

The present invention relates to the field of integrated circuits, and is more specifically directed to circuits for reducing the transient response time of a system in delivering required voltage to a load.

BACKGROUND

In order to reduce power consumption many electronic components are now capable of operating at several power consumption levels, one of which is typically a power-down or sleep mode. The power-down mode is a low power consumption level that the component can enter into when it is not performing an operation and not being accessed. Reducing the level of power consumption is particularly useful for battery operated devices, such as portable computers, where reducing power consumption increases the battery life, and therefore the time the device can be used without having to either replace or recharge the battery.

A microprocessor consumes a significant amount of power in the full power-up mode, and it is typically accessed only a small portion of the time, therefore it is advantageous to bring the microprocessor into the power-down mode when it is not being accessed. In the power-up mode the microprocessor can draw a current of 10 A or higher. In the power-down mode, the microprocessor can maintain its state with a current of as little as 100 $\mu$A (i.e. as much as 100,000 less than in the power-up mode). A power supply, such as a battery, typically supplies the current to the microprocessor through a voltage regulator. The time in which the voltage regulator can go from delivering the proper voltage for the current required in the power-down mode to delivering the proper voltage for the current required in the power-up mode, and vis versa, is the transient response time of the voltage regulator. The large change in current demand of the microprocessor, which is the load of the system, may bring the system out of regulation during the transient response.

In some configurations proposed circuits have changed the bandwidth of the voltage regulator when the feedback loop of the voltage regulator indicated that the voltage regulator is out of regulation because of the large change in current demand. Alternative proposals have suggested monitoring circuits that could monitor the current demand of the load and notify the voltage regulator after there is a change in the current demand of the load.

A problem with the above methods is that during the time that the change in current demand is going through the feedback loop, or by the time the monitoring circuit detects that the current demand of the load has changed, the load is not receiving the appropriate voltage. The present inventor has observed that another problem with the above method is that during the time it takes to detect the change in the current demand the load is not receiving the proper voltage due to the large current demand, the voltage regulator does not know that it is not delivering the required voltage and has not even changed its bandwidth, thus increasing the transient response time by this amount of time.

Another problem with switching the frequency of the voltage regulator is that in order to get the required voltage quickly enough the frequency during the transient response has to be very high, typically on the order of 500 kHz or more. This requires high performance components, which are typically complicated and expensive.

SUMMARY OF THE INVENTION

According to principles of the present invention, a load transient compensator is provided to reduce the transient response time of a system. The load transient compensator has a power supply input terminal, a control input terminal for coupling to a control circuit, and an output terminal for coupling to a power supply input terminal of a load. The control circuit has an access signal input terminal, a first control output terminal coupled to the load, and a second control output terminal coupled to the control input terminal of the load transient compensator.

In accordance with the method of operation of the circuit of the present invention, the power consumption level of the load is determined. The control circuit determines if the power consumption rate of the load is about to change. When power consumption rate of the load is about to increase, the load transient compensator is turned on to supply additional current to the load. When the power consumption rate of the load is about to decrease, the load transient compensator is turned on to drain current supplied to the load.

The load transient compensator allows a quick response to the large changes in current required by the load when the load is changing its level of power consumption, accomplished without greatly increasing the cost of the system containing the load and without compromising the stability of the system.

The novel features believed characteristic of the invention are set forth in the appended claims. The nature of the invention, however, as well as its features and advantages, may be understood more fully upon consideration of illustrative embodiments when read in conjunction with the accompanying drawings, wherein:

BRIEF DESCRIPTION OF THE DRAWINGS

FIG. 4 is a block diagram of a load transient compensator according to an embodiment of the present invention.

FIG. 5 is a circuit diagram of a load transient compensator according to an embodiment of the present invention.

DETAILED DESCRIPTION OF THE PREFERRED EMBODIMENT

In order to reduce the transient response time some circuits have added circuit elements described in detail in pending U.S. patent application entitled: "Device for Limiting Transient Variations of a Supply Voltage" by Luc Wuidart, Alain Bailly, and Jean-Michel Ravon, Ser. No. 08/935,580, filing date Oct. 17, 1997 (Attorney Docket Number 96-RO-177 and S1022/7902), incorporated herein by this reference. Another solution to the problem of reducing the transient response time includes a circuit that changes the bandwidth of the voltage regulator supplying the load. This is described in detail in pending U.S. patent application entitled: "Programmable Bandwidth Voltage Regulator" by Eric Danstrom, Ser. No. 08/574,609, incorporated herein by this reference.

Figure 1:
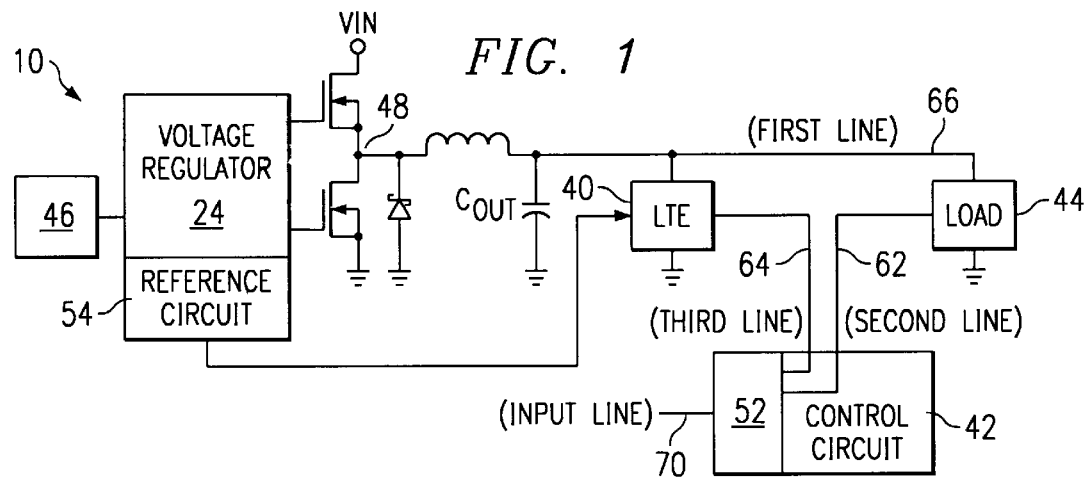
FIG. 1 is a block diagram of an electronic system including a load transient compensator according to an embodiment of the present invention.

According to the principles of the present invention, referring to FIG. 1, a load transient compensator is designated generally by the reference numeral 40. The load transient compensator is typically included in an electronic system 10, such as a computer 20 shown in FIG. 2. The computer includes a power source 46, such as a battery, that supplies a constant, unregulated voltage to a voltage regulator 24. The output 48 of the voltage regulator 24 is coupled to a power supply input terminal of the load transient compensator 40, and to a power supply input terminal of a dynamic load 44 via a first line 66. Typically, the voltage regulator 24 has a reference circuit 54 that generates a reference voltage, on which the output voltage of the voltage regulator 24 is based. In the preferred embodiment of the invention, the power supply input terminal of the load transient compensator 40 is connected to the reference circuit 54 to receive the same reference voltage of as the voltage regulator 24. The output terminal of the load transient compensator is coupled to the dynamic load 44.

The dynamic load 44 can be any component of the computer that can operate at either of at least two power consumption levels, one of which is preferably a sleep or power-down mode. A microprocessor 45 can be used as a typical dynamic load 44. Many microprocessors now manufactured can operate at both a power-up mode and a power-down mode. Additionally, because microprocessors consume a significant amount of power it is advantageous to bring the microprocessor into a power-down mode when it is not being accessed. The dynamic load 44, hereinafter microprocessor 45, has a control input terminal connected via a second line 62 to the first control output terminal of a control circuit 42. A third line 64 connects a second control output terminal of the control circuit 42 to a control input terminal of the load transient compensator 40.

An access signal input terminal that receives an access signal, signaling that the microprocessor 45 needs to be accessed, is received on an access signal input terminal 70 of the control circuit. The control circuit 42 has a sensing circuit 52 that detects whether the microprocessor 45 needs to be accessed, for example when there is an input on one of the input device, such as a keystroke, or when the microprocessor needs to access a drive. The sensing circuit detects this before the microprocessor 45 is actually accessed. The sensing circuit 52 also detects when the microprocessor 45 is to stop being accessed before the component stops being accessed. The sensing means is typically an integrated circuit dedicated to monitoring access to the microprocessor, e.g. such as a keyboard monitoring circuit or an application specific integrated circuit dedicated to monitoring access to the microprocessor, both of which are well known in the art. The control circuit 42 also monitors whether the microprocessor 45 is in the power-up or power-down stage. The control circuit 42 can be a separate IC or can be integrated into the microprocessor 45.

Figure 2:
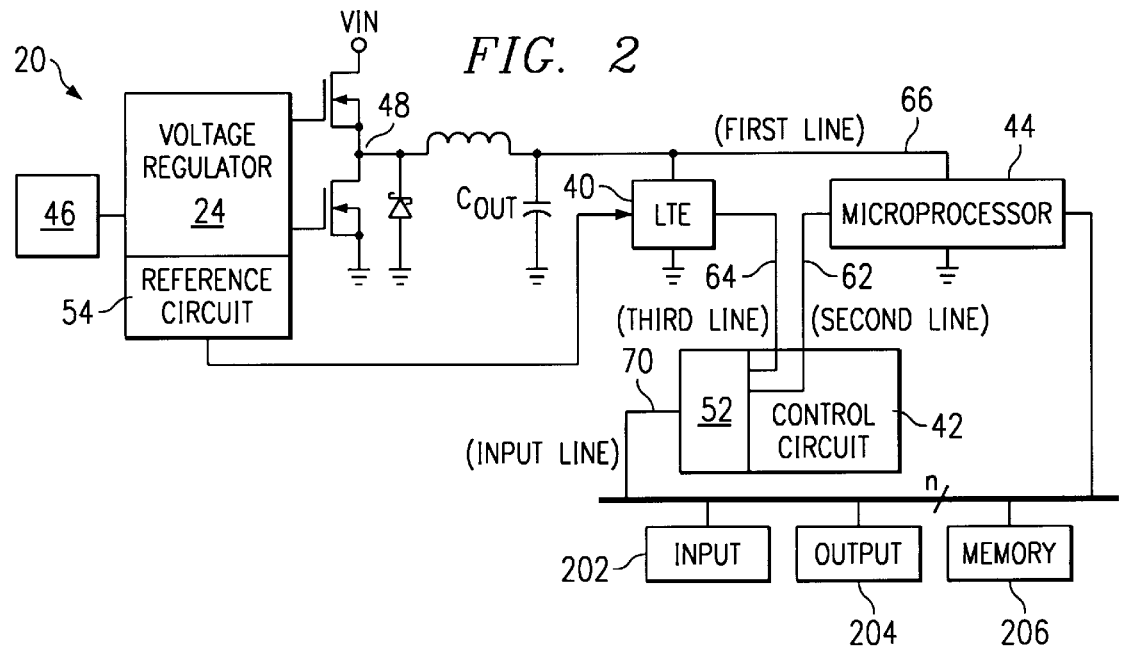
FIG. 2 is a block diagram of a computer including a load transient compensator according to an embodiment of the present invention.
Figure 3:
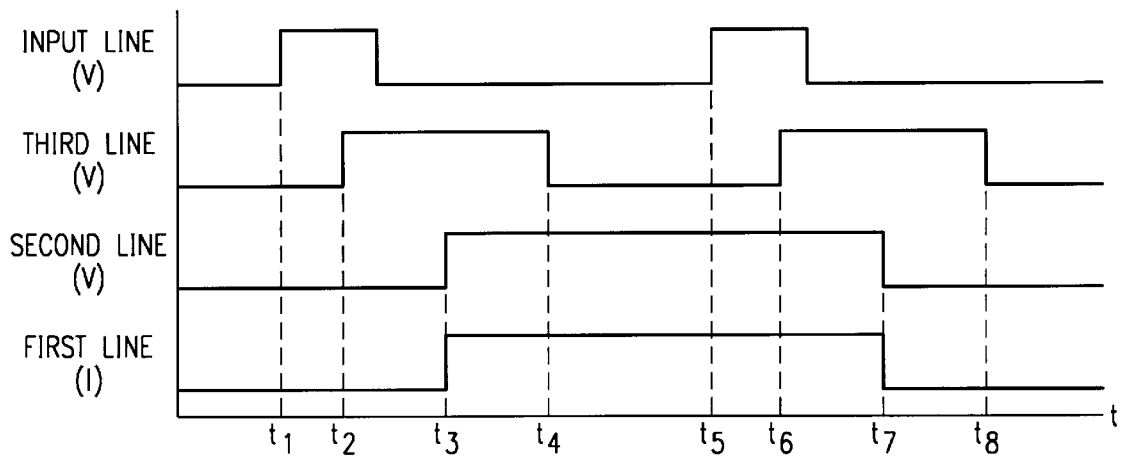
FIG. 3 is a timing diagram of the electrical system according to an embodiment of the present invention.

FIG. 3 shows the logic states of the input line 70 to the control circuit 42 and first 66, second 62, and third 64 lines that connect some of the elements of the computer. Referring to FIG. 2 and FIG. 3 simultaneously, one sample operation of the system will now be described. At time $t_1$ the microprocessor 45 is in the power-down mode and one of the components of the computer signals that the microprocessor 45 needs to be accessed. At $t_2$ the sensing means senses that the microprocessor needs to be accessed, typically by a change in the logic state of the input line 70, the third line 64 goes from the first logic state at which it is normally kept, preferably low, to a second logic state, preferably high. The sensing means signals the load transient compensator to turn on, to supply additional current to the microprocessor 45.

When the microprocessor 45 wakes up, i.e. exits the power-down mode and powers up, it starts to draw much more current. In modern technology, a typical microprocessor may require 10 or more amps. The time period within which the voltage regulator needs to respond to this increase in current, i.e. the transient time, is usually short, on the order of 1 μsec with current microprocessors.

At $t_3$, the control circuit 42 changes the logic state of the second line 62 from the first logic state to the second logic state, signaling the microprocessor 45 to exit out of the power-down mode. This can occur at the same time as the logic state on the third line 64 changes, signaling the load transient compensator 40 to turn on to provide the microprocessor 45 additional current, making $t_3$ equal to $t_2$, or a short period of time, for example 200 nsec, after the logic state on the third line 64 changes.

Supplying additional current to the microprocessor 45 reduces the amount of time the microprocessor 45 is not getting enough current.

When the microprocessor 45 start receiving the required voltage, at $t_4$, the logic state of the third line 64 goes back to the first logic state and the load transient compensator 40 is now turned off. Preferably, the control means 42 changes the logic state of the third line 64 back to the first logic state after a known time interval. One skilled in the art can calculate the time interval from $t_2$, the time the microprocessor requires a higher current, until $t_4$, the time at which the voltage regulator starts to deliver the voltage required by the load, based on the bandwidth of the voltage regulator 24, the load capacitor, the input voltage of the voltage regulator 24, and the properties of the microprocessor 45, such as the rate at which the microprocessor's current demand changes. However, the control means 42 can change the logic state of the third line 64 based on any known means of detecting that the required voltage is being delivered, such as: monitoring the microprocessor 45 through a monitoring circuit that can sense that the microprocessor is receiving the required load, or monitoring the voltage regulator 40 through its feedback loop.

The transition into the power-down mode follows a similar process. The time $t_5$ at which the microprocessor 45 should enter the power-down mode is typically determined through the operating system monitoring the access to the microprocessor 45 and determining that there has been no request to access the microprocessor 45 for a specific amount of time. At $t_5$ the sensing means 52 of the control circuit 42 senses that the microprocessor 45 should enter the power-down mode, typically by a change in the logic state of the input line 70 generated by the operating system. At time $t_6$, control circuit 42 changes the logic state on the third line 64 from the first logic state (preferably low) at which it is normally kept to a second logic state (preferably high). This signals the load transient compensator 40 to turn on, to sink the extra current supplied to the microprocessor 45.

At $t_7$, the control circuit 42 changes the logic state of the second line 62 from the second logic state to the first logic state, signaling the microprocessor 45 to enter into the power-down mode. This can occur at the same time as the logic state on the third line 64 changes, signaling the load transient compensator 40 to turn on, making $t_7$ equal to $t_6$, or a short period of time, for example 200 nsec, after the logic state on the third line 64 changes.

Sinking the extra current supplied to the microprocessor 45 reduces the amount of time the microprocessor 45 is getting too much current.

When the voltage regulator 24 starts to deliver the required voltage to the microprocessor 45, at $t_8$, the logic state of the third line 64 goes back to the first logic state and the load transient compensator 40 is now turned off. Preferably the control means 42 changes the logic state of the third line 64 back to the first logic state after a known time interval. One skilled in the art can calculate the time interval from $t_6$, when the microprocessor requires a lower current, to $t_8$, the time at which the voltage regulator 24 starts to deliver the proper voltage, based on the same criteria that the interval from $t_2$ to $t_4$ is calculated, i.e. bandwidth of the voltage regulator 24, the load capacitor, and the properties of the microprocessor 45. However, this can also be done by any known means of detecting that the current and voltage required by the load are supplied. Some examples such means are: monitoring the microprocessor 45 through a monitoring circuit that can sense that the microprocessor 45 is receiving the required current and voltage, or monitoring the voltage regulator 24 through its feedback loop.

FIG. 4 shows a block diagram of a load transient compensator 40 according to the present invention. The reference voltage received from the reference circuit 54 of the voltage regulator 24 is the received on a first input terminal of a comparison circuit 102. The output terminal of the load transient compensator 40 is connected back to a second input terminal of the comparison circuit 102. An output terminal of the comparison circuit 102 is connected to a power supply input terminal of an upper driver 104 and to a power supply input terminal of a lower driver 106. The upper driver 104 has a control input terminal connected to the upper control terminal of the control circuit 42. An output terminal of the upper driver 104 is connected to a control terminal of a first power transistor 108. A first terminal of the first power transistor is connected to $V_{CC}$, and a second terminal is connected to the output terminal of the load transient compensator 40, and therefore to the microprocessor 45. The lower driver 106 has a control input terminal connected to the lower control terminal of the control circuit 42. An output terminal of the lower driver 106 is connected to a control terminal of a second power transistor 110. A first terminal of the second power transistor 110 is connected to ground, and a second terminal is connected to the output terminal of the load transient compensator 40, and therefore to the microprocessor 45. Although the first and second power transistors 108, 110 are shown as n-channel transistors in FIG. 4, either or both transistors can be p-channel transistors.

FIG. 5 shows one example of a circuit of the load transient compensator shown in FIG. 4. Referring to FIG. 5, the comparison circuit is a comparator 112 having a non-inverting input connected to the reference voltage received from the reference circuit 54 of the voltage regulator 24, and an inverting input connected to the output terminal of the load transient compensator 40. The output terminal of the comparator 112 is connected to the non-inverting input of the first amplifier 114, which is the upper driver. The inverting input of the first amplifier 114 is connected to a reference voltage, typically ½ $V_{CC}$. The control terminal of the first amplifier is connected to the upper control terminal of the control circuit 42. The output of the first amplifier 114 is connected to a control terminal of the first power transistor 108. The first terminal of the first power transistor is connected to $V_{CC}$, and the second terminal is connected to the output terminal of the load transient compensator 40, and therefore to the microprocessor 45. The output terminal of the comparator is also connected to the inverting input of the second amplifier 116, which is the lower driver. The non-inverting input of the second amplifier 116 is connected to the reference voltage. The control input terminal of the second amplifier is connected to the lower control terminal of the control circuit 42. The output of the second amplifier 116 is connected to the control terminal of a second power transistor 110. The first terminal of the second power transistor 110 is connected to ground, and the second terminal is connected to the output terminal of the load transient compensator 40, and therefore to the microprocessor 45.

The first amplifier 114 should have hysteresis to prevent the first amplifier 114 from turning on when the voltage being supplied to the microprocessor 45 is below the voltage required by the microprocessor 45, but within an acceptable range of the voltage required by the microprocessor 45. The second amplifier 116 should have hysteresis to prevent the second amplifier 116 from turning on when the voltage being supplied to the microprocessor 45 is below the voltage required by the microprocessor 45, but within an acceptable range of the voltage required by the microprocessor 45. This will prevent the first and second amplifiers from entering a cyclic loop of turning on and off as the voltage supplied gets close to the required voltage and slightly overshoots and undershoots the required voltage. This will also prevent the load transient compensator 40 from turning on in the normal operating range of the power supply, even when the microprocessor 45 is changing power consumption levels. Typically, the hysteresis can be determined experimentally based on the load transient compensator 40 and the normal operating voltage of the power supply. The hysteresis can be any value between 25 and 100 mV.

At $t_2$ the control circuit 42 signals to the first amplifier 114 to turn on the first power transistor when the voltage regulator 24 is not providing enough current to the microprocessor 45 to provide the microprocessor 45 enough voltage. This provides additional current from $V_{CC}$ to the microprocessor 45, thereby reducing the transient response time. At $t_4$ the control circuit 42 signals to the first amplifier 114 to turn off the first power transistor 108.

At $t_5$ the control circuit 42 signals to the second amplifier 116 to turn on the second power transistor when the voltage regulator 24 is providing too much current to the microprocessor 45. This sinks some of the current, again reducing the transient response time. At $t_8$ the control circuit 42 signals to the second amplifier 116 to turn off the second power transistor 110.

Optionally, the control circuit 42 can have a third control output connected to the voltage regulator 24 to change the bandwidth of the voltage regulator 24 as described in pending U.S. patent application entitled: "Programmable Bandwidth Voltage Regulator" by Eric Danstrom, Ser. No. 08/574,609. Using the load transient compensator and changing the bandwidth of the voltage regulator 24 further reduces the transient response.

Therefore, the invention allows a quick response to the large increase or decrease in current required by the microprocessor when the microprocessor is changing its level of power consumption. This is accomplished without greatly increasing the cost of the system containing the microprocessor and without compromising the stability of the system. This is particularly advantageous for systems where a component can enter a power-down mode to reduce its power consumption, such as: battery operated systems where the reduction of power consumption will lead to an increase in battery life, "green" PCs designed to consume less power in an effort to allow more people access to computers without requiring an increase in generated power, and in an effort to preserve natural resources.

Although the invention has been specifically described with reference to several preferred and alternative embodiments, it will be understood by those skilled in the art having reference to the current specification and drawings that various modifications may be made and further alternatives are possible without departing from the spirit and scope of the invention as set forth in the appended claims.

I claim:

1. An electronic system comprising:

a component capable of operating at either of two power consumption levels, the component having a power supply input terminal, and a control input terminal;

a control circuit having an access signal input terminal, a first control output terminal coupled to the control input terminal of the component, and a second control output terminal;

the control circuit capable of detecting that the power consumption rate of the component is going to change prior to the power consumption rate changing; and a load transient compensator having a power supply input terminal, a control input terminal coupled to the second control output terminal of the control circuit, and an output terminal coupled to the power supply input terminal of the component, wherein the load transient compensator selectively supplies additional current to the component if the power consumption rate of the component is going to increase and drain current supplied to the component if the power consumption rate of the component is going to decrease in order to reduce the transient response time of a voltage that is supplying the component.

2. The electronic system according to claim 1, wherein:

the second control output terminal of the control circuit has an upper control terminal and a lower control terminal;

the control input of the load transient compensator comprises:

an upper control input terminal coupled to the upper control terminal of the control circuit; and a lower control input terminal coupled to the lower control terminal of the control circuit;

the load transient compensator further comprises:

an upper driver having a control input terminal coupled to the upper control input terminal of the load transient compensator, a power supply input terminal coupled to the power supply input terminal of the load transient compensator, and an output terminal;

a lower driver having a control input terminal coupled to the lower control input terminal of the load transient compensator, a power supply input terminal coupled to the power supply input terminal of the load transient compensator, and an output terminal;

a first power transistor having a control terminal coupled to the output terminal of the upper driver, a first terminal coupled to a supply, and a second terminal coupled to the output terminal of the load transient compensator; and a second power transistor having a control terminal coupled to the output terminal of the lower driver, a first terminal coupled to ground, and a second terminal coupled to the output terminal of the load transient compensator.

3. The load transient compensator according to claim 2, wherein the load transient compensator further comprises a comparison circuit having:

a first input terminal coupled to the power supply input terminal of the load transient compensator;

a second input terminal coupled to the output terminal of the load transient compensator; and an output terminal coupled to the power supply input terminals of the upper and lower drivers.

4. The electronic system according to claim 1, further comprising a voltage regulator having a reference voltage; and wherein the power supply input terminal of the load transient compensator is coupled to the reference voltage.

5. The electronic system according to claim 1, further comprising a sensing circuit having a sensing input terminal, a first sensing output terminal coupled to the control input terminal of the component, and a second sensing output terminal coupled to the control input terminal of the load transient compensator.

6. The electronic system according to claim 1, wherein the component comprises a processor.

7. The electronic system according to claim 1, wherein the control circuit is integrated into the component.

8. The electronic system according to claim 1, wherein the component is capable of operating at either of three power consumption levels.

9. An electronic system coupled to a load capable of operating at either of two power consumption levels, having a power supply input terminal, and a control input terminal, the electronic system comprising:

a control circuit capable of detecting that:

the load is to start being accessed prior to the load being accessed, based on an access signal, when the load is in a lower power consumption stage;

the load is to stop being accessed prior to the load stopping to be accessed based on the access signal, when the load is in a higher power consumption stage; and a load transient component coupled to an output terminal of the control circuit and to the power supply input terminal of the component for reducing the transient response time of a voltage that is supplying the load.

10. The electronic system according to claim 9, wherein:

the control circuit has an upper control terminal for notifying that the load is about to start being accessed, and a lower control terminal for notifying that the load is about to stop being accessed;

the load transient compensator comprises:

an upper control input terminal coupled to the upper control terminal of the control circuit; and a lower control input terminal coupled to the lower control terminal of the control circuit;

a power supply input terminal;

an output terminal coupled to the power supply input terminal of the load;

a first power transistor for providing additional voltage to the load when the load is about to start being accessed when the load is in a lower power consumption stage, the first power transistor having a control terminal, a first terminal coupled to a supply, and a second terminal coupled to the output terminal of the load transient compensator;

a second power transistor for draining voltage from the load when the load is about to stop being accessed when the load is in a higher power consumption stage, the second power transistor having a control terminal, a first terminal coupled to ground, and a second terminal coupled to the output terminal of the load transient compensator;

an upper driver having:
  a control input terminal coupled to the upper control input terminal of the load transient compensator for turning on the upper driver when the load is about to start being accessed;
  a power supply input terminal coupled to the power supply input terminal of the load transient compensator for supplying voltage to the load transient compensator; and
  an output terminal coupled to the control input of the first power transistor for turning on the first power transistor when the load is about to start being accessed when the load is in a lower power consumption stage;
a lower driver the lower driver having:
  a control input terminal coupled to the lower control input terminal of the load transient compensator for turning on the lower driver when the load is about to start being accessed;
  a power supply input terminal coupled to the power supply input terminal of the load transient compensator for supplying voltage to the load transient compensator; and
  an output terminal coupled to the control input of the second power transistor for turning on the second power transistor when the load is about to stop being accessed when the load is in a higher power consumption stage.

11. The electronic system according to claim 10, wherein the load transient compensator further comprises a comparison circuit having:
  a first input terminal coupled to the power supply input terminal of the load transient compensator;
  a second input terminal coupled to the output terminal of the load transient compensator; and
  an output terminal coupled to the power supply input terminals of the upper and lower drivers.

12. The electronic system according to claim 9, further comprising a sensing means for sensing if the load is about to be start or stop being accessed, the sensing means having a sensing input terminal, a first sensing output terminal coupled to the control input terminal of the load, and a second sensing output terminal coupled to the control input terminal of the load transient compensator.

13. The electronic system according to claim 9, wherein the load comprises a processor.

14. The electronic system according to claim 9, wherein the control circuit is integrated into the load.

15. A load transient compensator coupled to a load capable of operating at either of two power consumption levels, the load transient compensator comprising:
  a power supply input terminal;
  an output terminal coupled to the load;
  an upper driver having:
    a control input terminal for coupling to a control circuit capable of detecting when the load is to start being accessed prior to the load being accessed when the load is in a lower power consumption stage;
    a power supply input terminal coupled to the power supply input terminal of the load transient compensator; and
    an output terminal;
  a lower driver having:
    a control input terminal for coupling to a control circuit capable of detecting when the load is to stop being accessed prior to the load stopping to be accessed when the load is in a higher power consumption stage;
    a power supply input terminal coupled to the power supply input terminal of the load transient compensator; and
    an output terminal;
  a first power transistor having a control terminal coupled to the output terminal of the upper driver, a first terminal coupled to a supply, and a second terminal coupled to the output terminal of the load transient compensator; and
  a second power transistor having a control terminal coupled to the output terminal of the lower driver, a first terminal coupled to ground, and a second terminal coupled to the output terminal of the load transient compensator,
  wherein the load transient compensator selectively supplies additional current to the load when the load is in the higher power consumption stage and drains current supplied to the load when the load is in the lower power consumption stage in order to reduce the transient response time of a voltage that is supplying the load.

16. A load transient compensator coupled to a load capable of operating at either of two power consumption levels, the load transient compensator comprising:
  a power supply input terminal;
  an output terminal coupled to the load;
  an upper driver having:
    a control input terminal for coupling to a control circuit capable of detecting when the load is to start being accessed prior to the load being accessed when the load is in a lower power consumption stage;
    a power supply input terminal coupled to the power supply input terminal of the load transient compensator; and
    an output terminal;
    wherein the upper driver is a first amplifier, wherein the power supply input terminal is the non-inverting input of the amplifier;
  a lower driver having:
    a control input terminal for coupling to a control circuit capable of detecting when the load is to stop being accessed prior to the load stopping to be accessed when the load is in a higher power consumption stage;
    a power supply input terminal coupled to the power supply input terminal of the load transient compensator; and
    an output terminal;
    wherein the lower driver is a second amplifier, wherein the power supply input terminal is the inverting input of the amplifier;
  a first power transistor having a control terminal coupled to the output terminal of the upper driver, a first terminal coupled to a supply, and a second terminal coupled to the output terminal of the load transient compensator; and
  a second power transistor having a control terminal coupled to the output terminal of the lower driver, a first terminal coupled to ground, and a second terminal coupled to the output terminal of the load transient compensator,
  wherein the load transient compensator selectively supplies additional current to the load when the load is in the higher power consumption stage and drains current supplied to the load when the load is in the lower power consumption stage in order to reduce the transient response time of a voltage that is supplying the load.

17. The load transient compensator according to claim 15, further comprising a comparison circuit having:
   a first input terminal coupled to the power supply input terminal of the load transient compensator;
   a second input terminal coupled to the output terminal of the load transient compensator; and
   an output terminal coupled to the power supply input terminals of the upper and lower drivers.

18. A computer system comprising:
   a component capable of operating at either of two power consumption levels, having a power supply input terminal, and a control input terminal;
   a control circuit for detecting changes in operating conditions of the computer, and having a first control output terminal coupled to the control input terminal of the component, and a second control output terminal; and
   a load transient compensator having a power supply input terminal, a control input terminal coupled to the second control output terminal of the control circuit, and an output terminal coupled to the power supply input terminal of the component, wherein the load transient compensator selectively supplies additional current to the component if the power consumption rate of the component is going to increase and drain current supplied to the component if the power consumption rate of the component is going to decrease in order to reduce the transient response time of a voltage that is supplying the component.

19. The computer system according to claim 18, wherein:
   the second control output terminal of the control circuit has an upper control terminal and a lower control terminal;
   the control input of the load transient compensator comprises:
      an upper control input terminal coupled to the upper control terminal of the control circuit; and
      a lower control input terminal coupled to the lower control terminal of the control circuit;
   the load transient compensator further comprises:
      an upper driver having a control input terminal coupled to the upper control input terminal of the load transient compensator, a power supply input terminal coupled to the power supply input terminal of the load transient compensator, and an output terminal;
      a lower driver having a control input terminal coupled to the lower control input terminal of the load transient compensator, a power supply input terminal coupled to the power supply input terminal of the load transient compensator, and an output terminal;
      a first power transistor having a control terminal coupled to the output terminal of the upper driver, a first terminal coupled to a supply, and a second terminal coupled to the output terminal of the load transient compensator; and
      a second power transistor having a control terminal coupled to the output terminal of the lower driver, a first terminal coupled to ground, and a second terminal coupled to the output terminal of the load transient compensator.

20. The computer system according to claim 19, wherein the load transient compensator further comprises a comparison circuit having:
   a first input terminal coupled to the power supply input terminal of the load transient compensator;
   a second input terminal coupled to the output terminal of the load transient compensator; and
   an output terminal coupled to the power supply input terminals of the upper and lower drivers.

21. The computer system according to claim 18,
   further comprising a voltage regulator having a reference voltage; and
   wherein the power supply input terminal of the load transient compensator is coupled to the reference voltage.

22. The computer system according to claim 18, wherein the component comprises a microprocessor.

23. The computer system according to claim 18, wherein the control circuit is integrated into the component.

24. A computer system comprising:
   a component capable of operating at either of two power consumption levels, having a power supply input terminal, and a control input terminal;
   a control circuit for detecting changes in operating conditions of the computer, and having a first control output terminal coupled to the control input terminal of the component, and a second control output terminal; and
   a load transient compensator having a power supply input terminal, a control input terminal coupled to the second control output terminal of the control circuit, and an output terminal coupled to the power supply input terminal of the component, wherein the load transient compensator selectively supplies additional current to the component if the power consumption rate of the component is going to increase and drain current supplied to the component if the power consumption rate of the component is going to decrease in order to reduce the transient response time of a voltage that is supplying the component,
   wherein one of said levels of power consumption is a power-down level.

25. A computer system comprising:
   a component capable of operating at either of two power consumption levels, having a power supply input terminal, and a control input terminal;
   a control circuit for detecting changes in operating conditions of the computer, and having a first control output terminal coupled to the control input terminal of the component, and a second control output terminal; and
   a load transient compensator having a power supply input terminal, a control input terminal coupled to the second control output terminal of the control circuit, and an output terminal coupled to the power supply input terminal of the component, wherein the load transient compensator selectively supplies additional current to the component if the power consumption rate of the component is going to increase and drain current supplied to the component if the power consumption rate of the component is going to decrease in order to reduce the transient response time of a voltage that is supplying the component,
   wherein the component is capable of operating at three power consumption levels.

26. A method for regulating the voltage of an electronic system having a load transient compensator and a load capable of operating at either of two levels of power consumption, the load coupled to a power supply, comprising the steps of:

obtaining the power consumption level of the load;

detecting if the power consumption rate of the load is going to change;

turning on the load transient compensator to supply additional current to the load if the power consumption rate of the load is going to increase; and turning on the load transient compensator to drain current supplied to the load by the power supply if the power consumption rate of the load is going to decrease.

27. The method of claim 26, further comprising the steps of:

detecting that if the load is receiving the voltage required by the load; and turning off the load transient compensator when the load is receiving the voltage required by the load.

28. The method of claim 26, further comprising the steps of:

changing the level of power consumption of the load from a first power consumption level to a second power consumption level if the power consumption rate of the load is going to increase; and changing the level of power consumption of the load from the second power consumption level to the first power consumption level if the power consumption rate of the load is going to decrease.

29. The method of claim 28, wherein:

the steps of turning on the load transient compensator to supply additional current to the load and changing the level of power consumption of the load from the first power consumption level to the second power consumption level are performed concurrently; and the steps of turning on the load transient compensator to drain current supplied to the load and changing the level of power consumption of the load from the second power consumption level to the first power consumption level are performed concurrently.

* * * * *